US012695478B2

(12) United States Patent
Clark et al.

(10) Patent No.: US 12,695,478 B2
(45) Date of Patent: Jul. 28, 2026

(54) CONTROLLER AREA NETWORK (CAN) BUS TO POWER LINE CARRIER (PLC) SYSTEMS AND METHODS

(71) Applicant: Enatel, Christchurch (NZ)

(72) Inventors: Anton Clark, Christchurch (NZ); Michael McCormick, Christchurch (NZ)

(73) Assignee: Enatel (NZ)

( * ) Notice: Subject to any disclaimer, the term of this patent is extended or adjusted under 35 U.S.C. 154(b) by 0 days.

(21) Appl. No.: 18/684,226

(22) PCT Filed: Aug. 17, 2021

(86) PCT No.: PCT/NZ2021/050132

§ 371 (c)(1),
(2) Date: Feb. 16, 2024

(87) PCT Pub. No.: WO2023/022605

PCT Pub. Date: Feb. 23, 2023

(65) Prior Publication Data

US 2025/0141493 A1     May 1, 2025

(51) Int. Cl.
H02J 7/44          (2026.01)
H04B 3/54          (2006.01)

(52) U.S. Cl.
CPC ................ H04B 3/548 (2013.01); H02J 7/44 (2026.01)

(58) Field of Classification Search
CPC ............................. H04B 3/548; H02J 7/00036
(Continued)

(56) References Cited

U.S. PATENT DOCUMENTS

| | | | |
|---|---|---|---|
| 7,471,066 | B2 | 12/2008 | Ambrosio |
| 9,071,074 | B2 | 6/2015 | Chen |

(Continued)

FOREIGN PATENT DOCUMENTS

| | | |
|---|---|---|
| CN | 206544472 U | 10/2017 |
| EP | 3386065 A1 | 10/2018 |
| KR | 20170116839 A | 10/2017 |

OTHER PUBLICATIONS

International Search Report and Written Opinion of international application No. PCT/NZ2021/050132, dated Nov. 25, 2021, 9 pp.
(Continued)

*Primary Examiner* — Dominic D Saltarelli
(74) *Attorney, Agent, or Firm* — Greenberg Traurig, LLP

(57) ABSTRACT

An apparatus to communicate with a battery management system (BMS) of a battery includes a memory and a processor coupled to the memory. The apparatus further includes a first electrical conductor configured to connect the processor to a controller area network (CAN) bus connected to the battery management system (BMS) of the battery. The apparatus further includes a second electrical conductor configured to connect the processor to a first winding of a transformer of the battery. A second winding of the transformer is connected to a power line of the battery. The processor is further configured to receive first data from the BMS via the CAN bus, transmit second data based on the first data to the battery charger via the power line, receive third data from the battery charger via the power line, and transmit fourth data based on the third data to the BMS via the CAN bus.

20 Claims, 13 Drawing Sheets

(58) Field of Classification Search
USPC ........................................................ 375/258
See application file for complete search history.

(56) References Cited

U.S. PATENT DOCUMENTS

| | | | |
|---|---|---|---|
| 2006/0132089 A1 | 6/2006 | Ambrosio | |
| 2018/0097372 A1 | 4/2018 | Li | |
| 2021/0167615 A1* | 6/2021 | Sekimoto | ........... H02J 7/00032 |

OTHER PUBLICATIONS

Jousse et al. "Power line communication management of battery energy storage in a small-scale autonomous photovoltaic system." IEEE Transactions on Smart Grid 8.5 (2016): 2129-2137.
Kongter Test & Measurement Co., Limited, BMS-3923 Battery Monitoring System, undated, 9 pp.
Saleem, "Development of PLC based communication architecture for battery management system." 2020 IEEE 91st Vehicular Technology Conference (VTC2020-Spring). IEEE, 2020, 5 pp.
Office Action from New Zealand application No. 808511, dated Oct. 31, 2025, 3 pp.

* cited by examiner

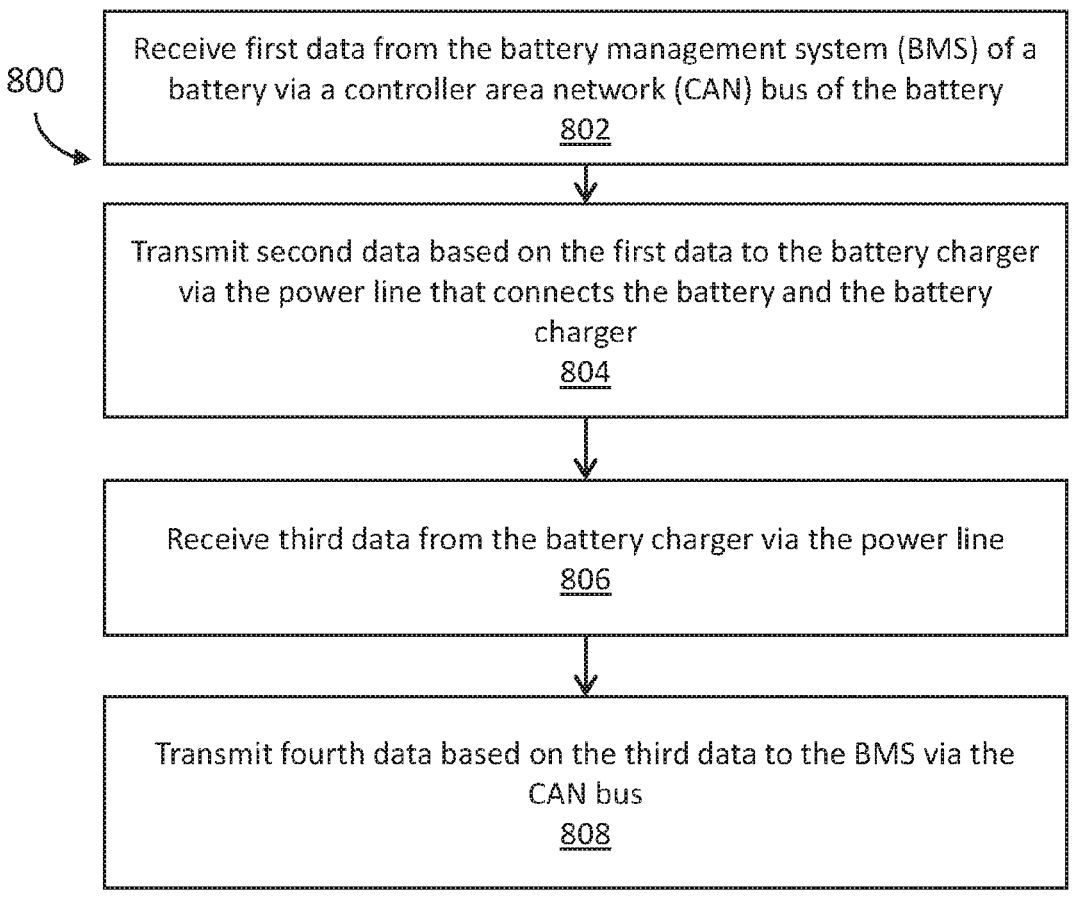

800

Receive first data from the battery management system (BMS) of a battery via a controller area network (CAN) bus of the battery
802

Transmit second data based on the first data to the battery charger via the power line that connects the battery and the battery charger
804

Receive third data from the battery charger via the power line
806

Transmit fourth data based on the third data to the BMS via the CAN bus
808

900

Receive first data at a module from a battery charger via power line carrier (PLC) signal
902

Store received first data in memory of the module
904

Processor timer of the module triggers transmission of second data
906

Transmit second data from the memory via a controller area network (CAN) bus to a battery management system (BMS) of a battery
908

1000

Receive first data at a module from a battery charger via power line carrier (PLC) signal
1002

Store received first data in memory of the module
1004

Receive request for second data from a battery management system (BMS) of a battery via a controller area network (CAN) bus
1006

Transmit the second data from the memory via the CAN bus to a battery management system (BMS) of a battery
1008

1100

Receive first data at a module from a battery management system (BMS) of a battery via a controller area network (CAN) bus
1102

Store received first data in memory of the module
1104

Receive request for second data from a battery charger via power line carrier (PLC) signal
1106

Transmit the second data from the memory via PLC signal to the battery charger
1108

CONTROLLER AREA NETWORK (CAN) BUS TO POWER LINE CARRIER (PLC) SYSTEMS AND METHODS

FIELD OF THE DISCLOSURE

The present disclosure generally relates to storing energy using batteries and more particularly to management of charging batteries using communications between a battery charger and a battery management system (BMS) of a battery.

BACKGROUND

A battery charging system may include a battery charger that is configured to charge one or more batteries. The battery may include a battery management system (BMS) that measures characteristics of the batter, such as voltage, temperature, and/or charge state.

SUMMARY

An illustrative method of communicating between a battery and a battery charger includes receiving, at a processor, first data from a battery management system (BMS) of the battery via a controller area network (CAN) bus of the battery. The method further includes transmitting, by the processor, second data indicative of the first data to a controller of the battery charger via a power line configured to connect the battery and the battery charger.

Another illustrative method of communicating between a battery and a battery charger includes receiving, at a processor, first data from a controller of the battery charger via a power line configured to connect the battery and the battery charger. The method further includes transmitting, by the processor, second data indicative of the first data to a battery management system (BMS) of the battery via a controller area network (CAN) bus of the battery.

An illustrative apparatus to communicate with a battery management system (BMS) of a battery includes a memory and a processor coupled to the memory. The apparatus further includes a first electrical conductor configured to connect the processor to a controller area network (CAN) bus connected to the battery management system (BMS) of the battery. The apparatus further includes a second electrical conductor configured to connect the processor to a first winding of a transformer of the battery. A second winding of the transformer is connected to a power line of the battery. The processor is further configured to receive first data from the BMS via the CAN bus, transmit second data based on the first data to the battery charger via the power line, receive third data from the battery charger via the power line, and transmit fourth data based on the third data to the BMS via the CAN bus.

BRIEF DESCRIPTION OF THE DRAWINGS

FIG. 8 is a flow chart illustrating an example method for communicating between a battery and battery charger, in embodiments.

DETAILED DESCRIPTION

Figure 1:
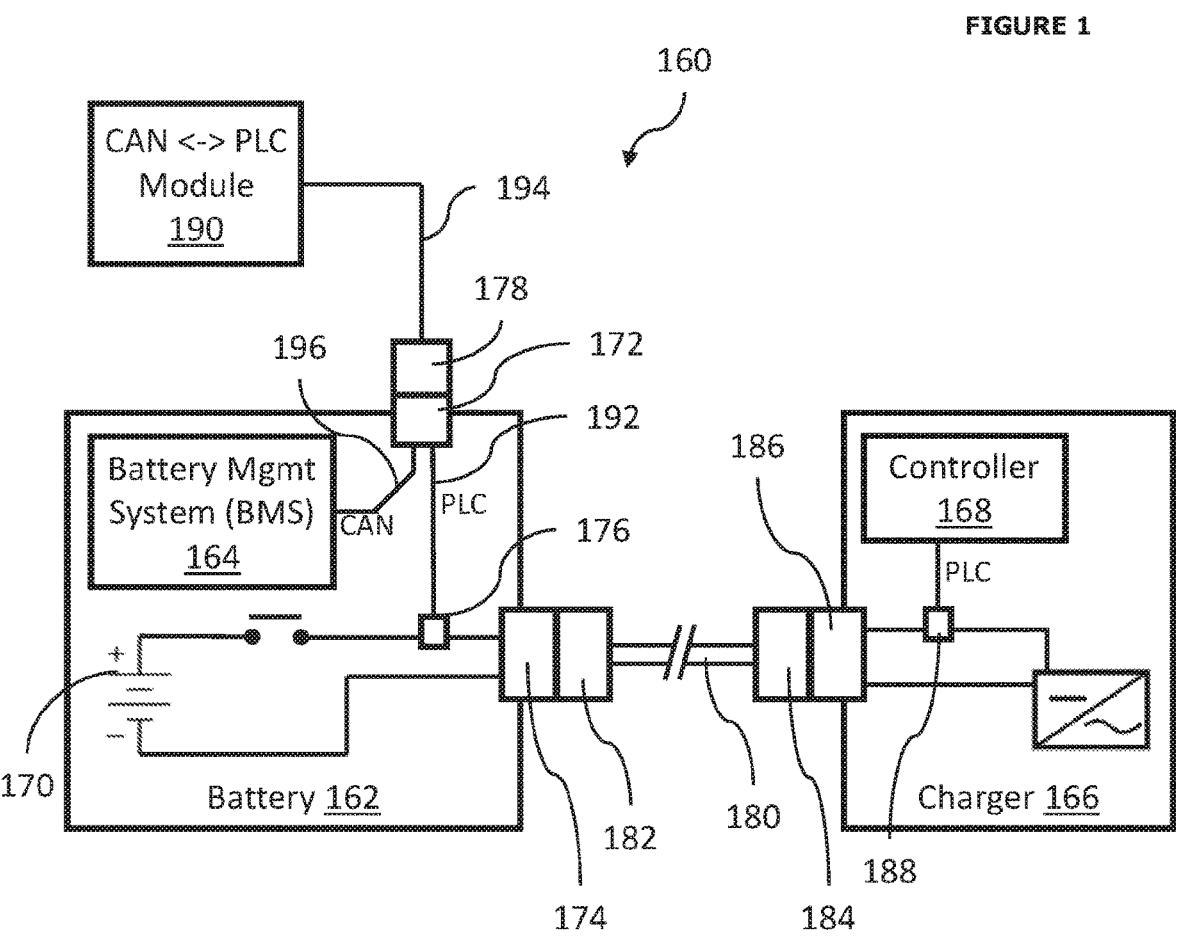
FIG. 1 is a diagrammatic view of an example battery charging system in which a battery and battery charger communicate using power line carrier (PLC) signals, in embodiments.

The following disclosure of example methods and apparatus is not intended to limit the scope of the detailed description to the precise form or forms detailed herein. Instead the following disclosure is intended to be illustrative so that others may follow its teachings.

To get the best performance out of a battery, such as a lithium ion battery, the charger should be using a charge profile that is dynamically matched to the battery. This information, such as the voltage, temperature, and/or charge state of each cell in a battery, is available to a battery's battery management system (BMS). Consequently, batteries such as motive power lithium ion batteries may be charged efficiently by using information collected by the BMS about a battery and/or its individual cells. For example, a BMS of a battery may use the voltage, temperature, charge state, etc. information to determine and send charging instructions (that take voltage, temperature, charge state, etc. into account) to a battery charger. In various embodiments, a BMS may also send information about its battery or battery cells, and the charger may determine how to charge a battery based on that information.

Different communication links may be used to facilitate communication between a battery and a battery charger. For example, a controller network area (CAN) bus may be used to facilitate communication between a battery and a battery charger. In doing so, a charge cable assembly that connects a battery and battery charger may be used that includes both cables for transmission of power, as well as additional cables for transmitting information about the battery, charging instructions, etc. between the battery and the battery charger. For batteries such as those used for motive power, batteries are frequently connected to and disconnected from battery chargers (e.g., disconnected when in use for motive power and connected while charging). As such, the cable assembly may be removably attachable to one or both of the battery and the battery charger. However, power cables for motive battery charging may be bulky, heavy, and stiff compared to smaller and more fragile communications cables typically used such a cable assembly. Accordingly, the combination of these two types of wires may cause damage or failure of the communications wires, particularly given the rough handling such cable assemblies routinely experience in settings where motive power is desired (e.g., for forklifts in a warehouse).

Accordingly, described herein are various systems, apparatuses, methods, and computer readable media for facilitating communications between a battery and a battery charger that eliminates the use of the smaller signal cables in a cable assembly used to charge a battery. For example, described herein is a module removably or permanently attachable to a battery that receives communications from a BMS of a battery via a CAN bus of the battery that can also communicate information to the battery charger in a manner different than via the CAN bus and signal wires that run from the battery to the battery charger. In particular, the module is configured to send communications via the power line cables between the battery and battery charger, such that only the power line cables are needed to connect the battery and the battery charger for both charging and communication.

Such a module as described herein may be permanently or removably installed on a battery. The module may convert data and signals received via a CAN bus link from the BMS of a battery into a power line carrier (PLC) signal and vice versa. PLC signals may be superimposed on the power cables, so that communications may travel between the battery and the charger while the battery is charging. The charger may also include a PLC receiver so that the PLC signals may be received and decoded from the module. In this way, PLC signals may be used to communicate with power cables only, and no dedicated communication wiring may be used. Such a simplification of the charge cable construction may also reduce manufacturing costs and time to manufacture the cables, as well as reducing the total amount of materials needed for the cables. Accordingly, described herein are various systems, apparatuses, methods, and computer readable media for a battery mounted module that is configured to convert CAN bus signals to PLC signals, send PLC signals over power lines between a battery and charger to facilitate communication between the charger and the battery, and vice versa. In various embodiments, wireless transceivers on the battery/module and charger may be used to facilitate communication between the battery and the charger. In such embodiments, instead of using the module to convert CAN bus signals to PLC signals and vice versa, the module may convert CAN bus signals to wireless signals for transmission from a battery to a charger via a transceiver (and vice versa). In any instance, the module described herein is configured to receive CAN bus signals, convert those signals to a second format, transmit signals in that second format, receive signals in that second format, and/or convert received signals in the second format back into CAN bus signals.

Referring now to the drawings, wherein like numerals refer to the same or similar features in the various views, FIG. 1 is a diagrammatic view of an example battery charging system 160 in which a battery 162 and battery charger 166 communicate using power line carrier (PLC) signals, in embodiments.

The system 160 includes a module 190 for converting signals between CAN bus signals and PLC signals as described herein. In particular, the module 190 may receive charging information from a battery management system (BMS) 164 of the battery 162 over a controller area network (CAN) bus 196 of the battery 162. Information received via the CAN bus 196 may be converted to power line carrier (PLC) signals to transmit the information to the charger over PLC signals. For example, the PLC signals may be transmitted by the module 190 and pass through an electrical conductor 194, through connectors 178 and 172, through an electrical conductor 192 to a transformer 176. The transformer 176 superimposes the PLC signals on to a power line 180 connecting the battery 162 and the charger 166.

The BMS 164, by way of the module 190, may also receive information such as status updates from the charger 166 over PLC via the power line 180, the transformer 176, the electrical conductor 192, the connectors 178 and 172, the electrical conductor 194, and the CAN bus 196. The module 190 may transmit such information to the BMS 164 over the CAN bus 196 in an opposite manner to which signals from the BMS 164 are transmitted to the charger 166. The module 190 may also provide a pilot signal to notify the BMS 164 that a charger such as the charger 166 is connected via the power line 180. The module may also include a memory (shown in FIG. 2), and therefore may also store records of the battery 162's usage, voltage history, charge state history, temperature history, etc. The battery 162 further includes the PLC transformer 176 that superimposes PLC signals onto the power line 180 and/or receives PLC signals and transforms them to transmit them along the electrical connector 192 and eventually to the module 190.

The BMS 164 may further include various sensors used to determine the condition of the battery 162, such as its temperature, voltage, state of charge, etc. The BMS 164 may further use this information to determine how the battery should be charged. These instructions may be transmitted over the CAN bus 196. In other system, such instructions would be transmitted over the CAN bus directly to a charger. However, in FIG. 1, such instructions are converted to PLC signals for transmission over the power line 180 using the module 190 as described herein. The BMS 164 may also receive information about the charger 166's status over a CAN bus, and therefore a controller 168 of the charger 166 may be configured to communicate PLC signals to the BMS 164 via the module 190 as described herein. For example, transformer 188 of the charger 166 may receive PLC signals from the controller 168 and superimpose those signals onto the power line 180. In various embodiments, a charger could include a module for converting signals to and/or from PLC signals to another type of signal (e.g., CAN bus signals)

depending on what type of signals the controller 168 is configured to understand (e.g., receive, transmit, etc.).

The battery 162 may further include battery cells 170, a charge contactor, fuses, buswork (e.g., rigid metal conductors associated with main battery poles), internal cabling (e.g., a CAN bus), and a charge connector 174. The charge connector 174 is configured to removably attach to a power line connector 182 so that the power line 180 may be connected to the battery 162 and the charger 166. The battery 162 may further include a connector 172 for connecting to a connector 178 of the module 190. The connector 172 and the connector 178 may be configured for removably attaching or for permanent attachment to one another. For example, a male-type Deutsch DT connector may be the connector 178 and connected to the electrical conductor 194 (e.g., as shown in and described with respect to FIGS. 4C and 6), while a female-type Deutsch DT connector may be the connector 172 and connected to the electrical conductors 192 and 196. In this way, the connectors 172 and 178 may be removably attached to one another so that the module 190 may be plugged into the battery 162 during charging and removed while the battery 162 is in use. In other embodiments, the module 190 may be hard wired to the battery 162 without the use of connectors (e.g., the electrical conductors 196 and 192 just extend from the BMS 164 and transformer 176, respectively, without passing through a connector). In various embodiments, the module 190 may also be integrated into a housing of the battery 162, rather than external to a housing of the battery 162 as shown in FIG. 1.

Similarly, the charger 166 also includes a connector 186 to which a connector 184 of the power line 180 may be connected either permanently or removably. In various embodiments, the charger 166 may not include the connectors 184 and 186, as the power line 180 may be permanently hardwired to the charger 166 (e.g., the power line 180 runs directly into the housing of the charger 166 and connects to components of the charger 166 within the housing of the charger 166). The controller 168 controls the charger's power conversion modules. The controller may receive and transmit information using PLC signals using the PLC transformer 188 to superimpose PLC signals on the power line 180.

Accordingly, using the system 160, various batteries such as lithium ion batteries (e.g., the battery 162) may communicate with a charger (e.g., the charger 166) to provide instruction on how the battery should be charged. This is because the BMS has additional information about the condition of the battery (such as the temperature, voltage, charge state of each cell) that can be used to ensure the small margins between a normal and overcharge situation are not exceeded.

The module 190 therefore has two interfaces—the CAN bus 196 interface which communicates with the BMS 164 using the existing CAN bus interface of the BMS 164, and a power line carrier (PLC) interface which communicates with the charger 166 over the power line 180 charge cables as described herein. The connector 172 of the battery 162 may also be an integration connector that allows power to be supplied to the module 190, such as directly from the battery bus or an auxiliary supply. The connector 172 may further include an interface for a pilot signal of a battery and/or charger as desired in various embodiments.

The module 190 may also be connected to the PLC transformer 176 placed over at least one of the charge cables integral to the battery. As described further below with respect to FIG. 12, communication signals superimposed onto a power line (e.g., PLC signals) may travel around a complete loop between the battery 162 and the charger 166 (e.g., down one pole of the charge cable, through the battery, down the other pole of the charge cable, and through the capacitance of the charger). The transformer 176 may be provided as part of the battery 162 and connected to through the connectors 172 and 178, or may be part of and directly connected to the module 190. In other words, the transformer 176 may be located in various places with respect to the components shown in FIG. 1, as long as the transformer 176 is located somewhere along power line loop within the battery 162. Similarly, the transformer 188 may be located in various places with respect to the components shown in FIG. 1, as long as the transformer 188 is located somewhere along the power line loop within the charger 166. In various embodiments, the module 190 and/or the connector 172 (as well as other components of FIG. 1 described herein) may be provided by the battery manufacturer when the battery 162 is built, or may be retrofitted to the battery 162 at a later time. Use of the module 190 may also be optional—the battery 162 and the charger 166 may still be used together without the module 190, and the module 190 may be fitted for use with the battery 162 and the charger 166 at a later date.

Advantageously, the module 190 eliminates the use of auxiliary circuits in the charging cable/power line 180, as well as connection points for such auxiliary circuits (e.g., at the connectors 174, 182, 184, 186). The combination of the very large charging cores and contacts and small communication cores and contacts within a charge cable and connectors may therefore be avoided using the various embodiments described herein. Failure of auxiliary cores or connector contacts is a significant reliability issue, and omitting the communication portion of such circuits may therefore decrease such reliability issues.

Figures 2, 3:
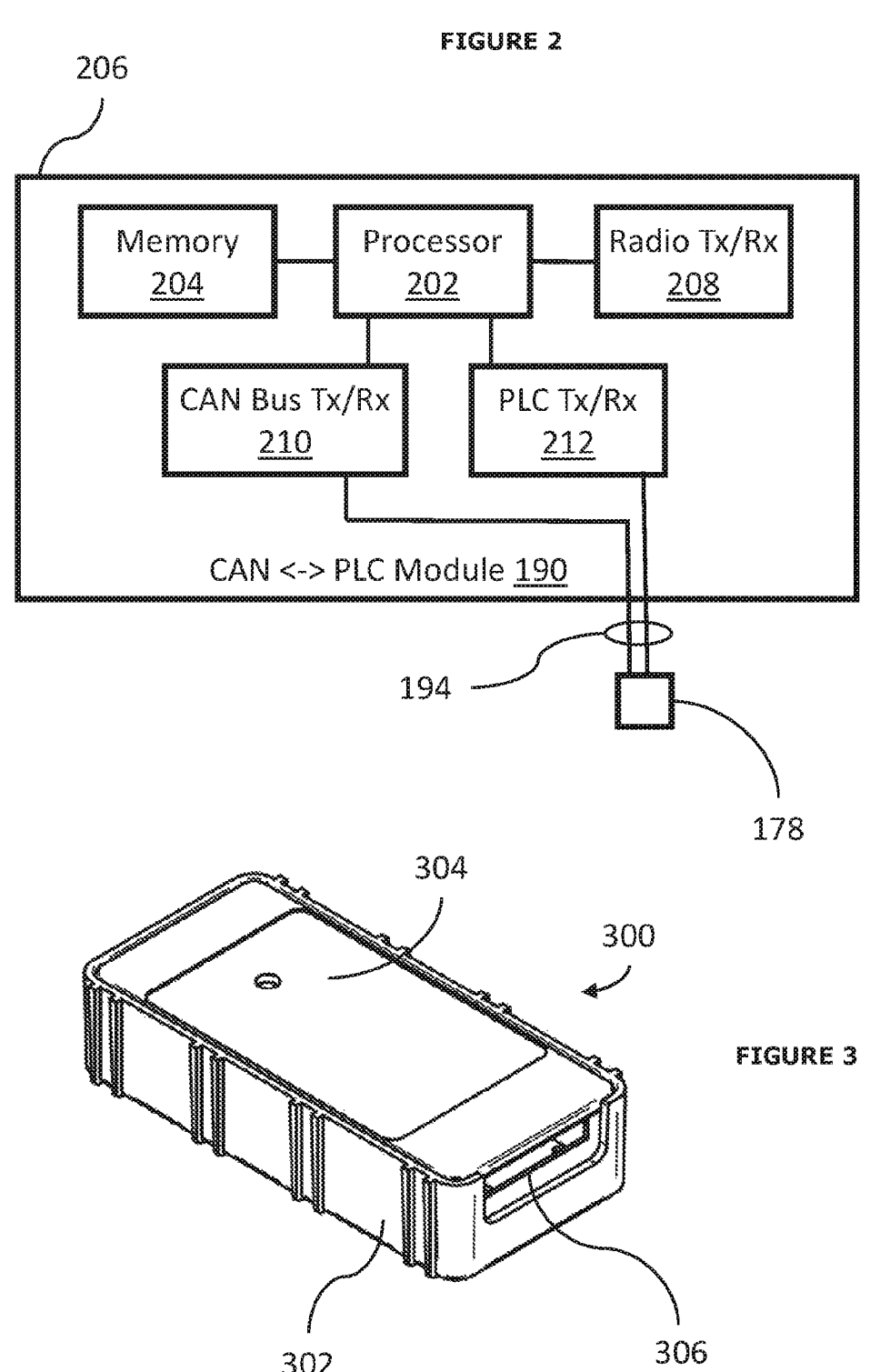
FIG. 2 is a diagrammatic view of an example module for facilitating battery and battery charger communications between a controller area network (CAN) bus of the battery and a power line connecting the battery and the battery charger, in embodiments.
FIG. 3 is a perspective view of an example housing of a module for facilitating battery and battery charger communications between a controller area network (CAN) bus of the battery and a power line connecting the battery and the battery charger, in embodiments.

FIG. 2 is a diagrammatic view of an example module 190 for facilitating battery and battery charger communications between a controller area network (CAN) bus of the battery and a power line connecting the battery and the battery charger, in embodiments. The module 190 may be used as, for example, the module 190 of FIG. 1 described herein. The module 190 includes a housing 206 in which a memory 204 and a processor 202 are located. The module 190 may further include a PLC transceiver 212 configured to interface with a power line, a CAN bus transceiver 210 configured to interface with a CAN bus, and a radio transceiver 208 configured to wirelessly transmit and/or receive communications. A cable 194 may run from the processor 202 to the connector 178, and may include multiple electrical conductors for transmission of data, signals, power, etc. between the module 190 and the BMS of a battery and a power line for PLC signals.

The module 190 may also store data in a status page on the memory 204. This status page may be updated with data received from a charger over PLC and/or with data received from a BMS over a CAN bus. For example, the processor 202 of the module 190 may communicate in the following ways: 1) receive a data request from a charger or BMS; 2) respond to a data request from a charger or BMS using data sourced from the status page; 3) receive data from a message broadcast at regular intervals by a charger or BMS and store it in the status page; 4) send out a message at regular intervals to a charger or BMS using data sourced from the status page; 5) make a request for data to a charger or BMS; and/or 6) receive a response to a data request it made from a charger or BMS and store it in the status page.

Accordingly, the module 190 may communicate among two interfaces (via CAN bus and PLC to the BMS and to the charger, respectively) to operate independently so that the timing, structure and content of the messages may be different. For example, the module 190 may behave from the perspective of a BMS in the same way a charger connected directly to a BMS over CAN bus would. The BMS therefore may not be aware that the BMS is connected to the module 190 rather than directly to a charger. The two interfaces may include the CAN bus interface 210 and the PLC interface 212. The CAN bus interface 210 and the PLC interface 212 are connected to the processor, so that signals may be transmitted and received by the processor over either of a CAN bus or PLC. A radio transceiver 208 (or other type of wireless transceiver) may also optionally be included in the module 190 so that the module 190 may receive or transmit data to another computing device capable of radio or other wireless communications.

FIG. 3 is a perspective view of an example housing 300 of a module for facilitating battery and battery charger communications between a controller area network (CAN) bus of the battery and a power line connecting the battery and the battery charger, in embodiments. The housing 300 includes a lid 304, a main body 302, and an opening 306 for electrical conductors to enter the housing 300.

Figure 4A:
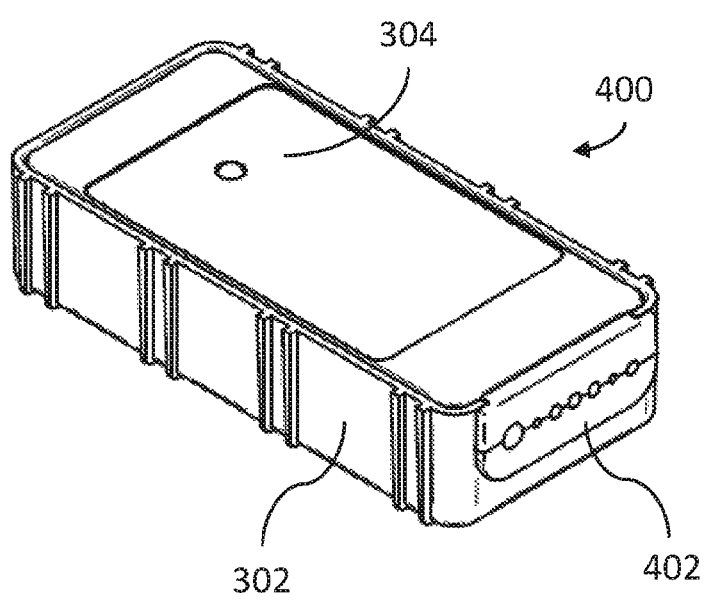
FIG. 4A is a perspective view of the example housing of FIG. 3 with a connector for electrical conductors inserted into an opening of the housing, in embodiments.

FIG. 4 is a perspective view 400 of the example housing 300 of FIG. 3 with a seal 402 for electrical conductors inserted into the opening 306 of the housing 300. In other words, the seal 402 may facilitate entry of electrical conductors that interface with a CAN bus and a power line of a battery as described herein. The seal 402 may also protect against the ingress of moisture and dust into the housing 300.

Figure 5:
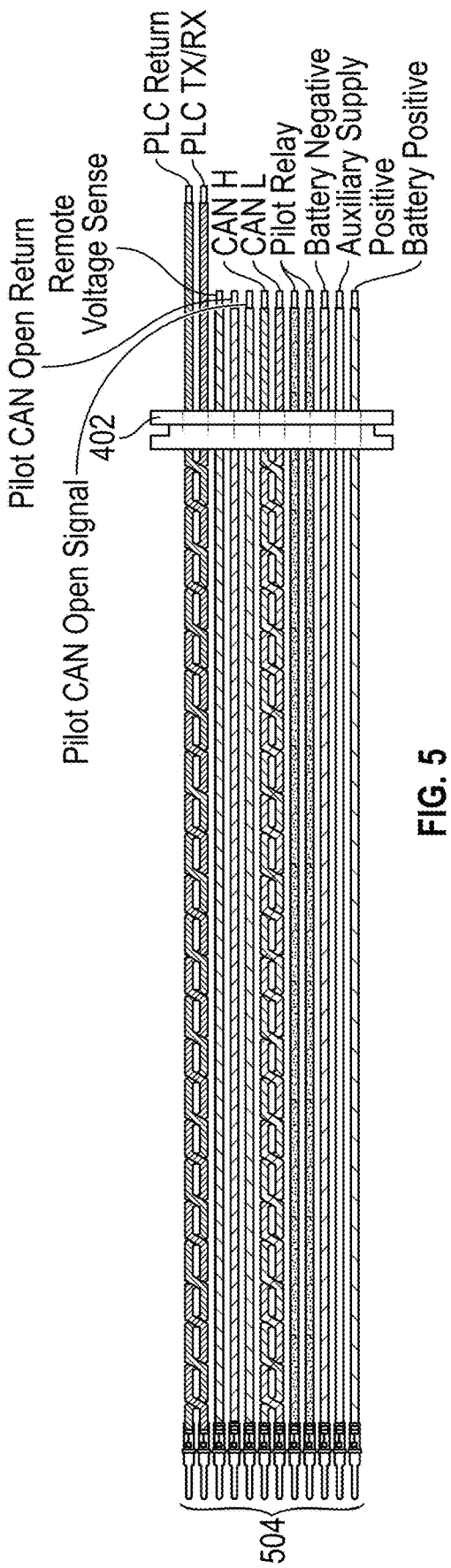
FIG. 5 is a diagrammatic view of example electrical conductors used to connect a module for facilitating battery and battery charger communications and the battery, in embodiments.

FIG. 5 is a diagrammatic view of example electrical conductors 504 used to connect a module for facilitating battery and battery charger communications and the battery, in embodiments. For example the electrical conductors 504 may include a PLC return line, PLC transmit/receive line, a remote voltage sense line, pilot lines, a CAN high line, a CAN low line, and power lines for supplying power to a module for facilitating CAN to PLC communications. The PLC return and PLC transmit/receive lines may be used to communicate using PLC signals as described herein. The pilot lines may be of different types or a single type, and may support one or more type of pilot signal. The pilot signals may be used to determine if a battery charger is connected to a battery to which the module is connected. The CAN lines may be used to communicate with a BMS over a CAN bus as described herein.

Figure 6:
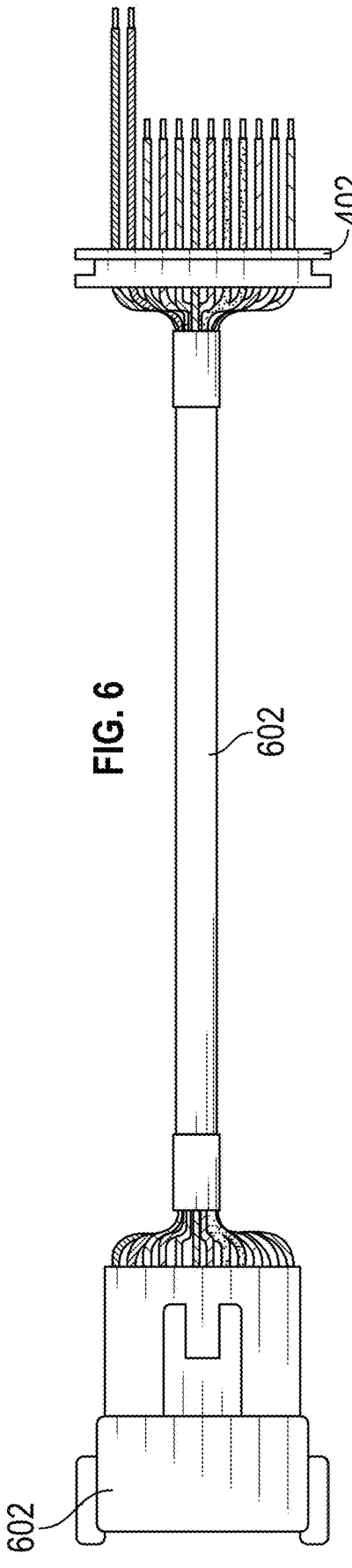
FIG. 6 is a diagrammatic view of the example electrical conductors of FIG. 5 with a protective jacket around the electrical conductors, in embodiments.

FIG. 6 is a diagrammatic view of the example electrical conductors 504 of FIG. 5 with a protective jacket 602 around the electrical conductors, in embodiments. The electrical conductors 504 are further terminated in a connector 602, that may be used as the connector 178 of FIG. 1 for connecting a module to a battery as described herein.

Figure 7:
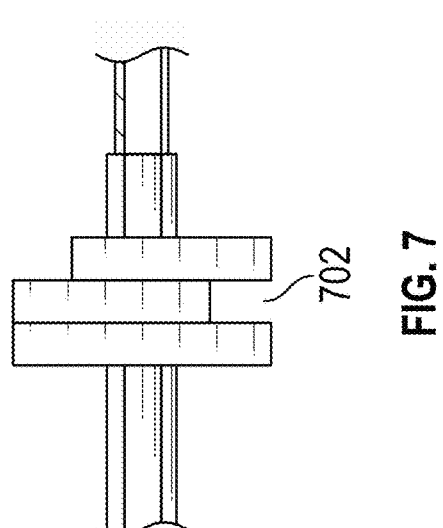
FIG. 7 is a side view of a connector for insertion into an opening of a housing of a module for facilitating battery and battery charger communications, in embodiments.

FIG. 7 is a side view of the seal 402 for insertion into an opening of a housing of a module for facilitating battery and battery charger communications. The seal 402 includes a groove 702 that fits around a side wall of the opening 306 of the housing 300 to ensure a secure fit of the electrical conductors that are passed through to the inside of the housing 300, as well as sealing everything in the housing 300 to protect from environment such as water and dust. For example, the housing 300 may be sealed to be water and dust proof by potting the housing 300 with a silicone compound. The seal 402 may be such a seal or part of such a seal. The seal 402 may be a piece of rubber molded over the wires or electrical conductors that pass through the opening 306 into the housing.

Figure 4B:
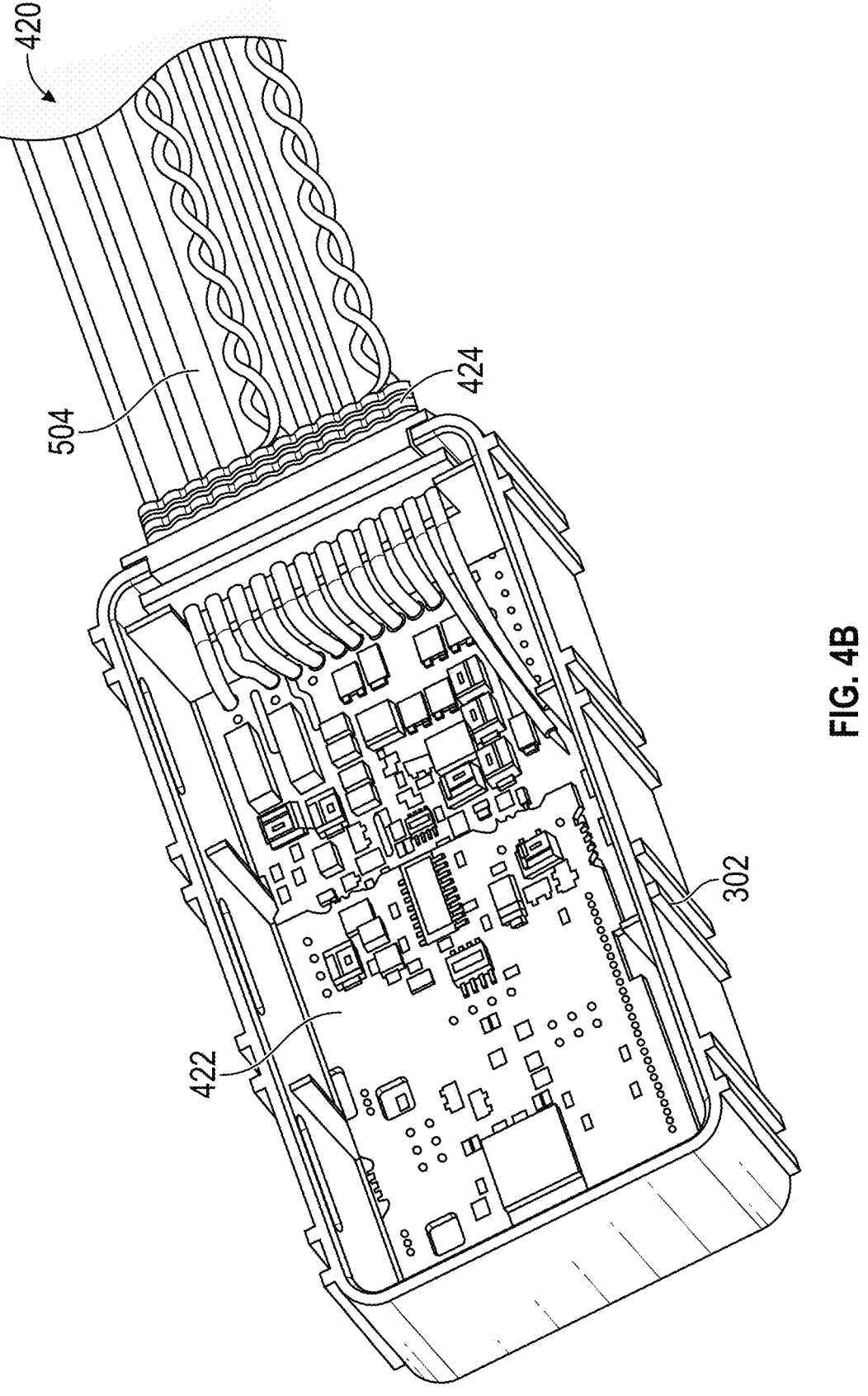
FIG. 4B is a perspective view of the example housing of FIG. 3 showing a printed circuit board therein, in embodiments.

FIG. 4B is a perspective view 420 of the example housing 302 of FIG. 3 showing a printed circuit board (PCB) 422 therein, in embodiments. The PCB 422 may include components such as those depicted in FIG. 2. The housing 302 may further receive a seal 424 configured to prevent contamination from entering the housing 302 where the electrical conductors 504 enter the housing 302. As shown in FIG. 4B, the electrical conductors 504 may pass through the seal 424 so that the electrical conductors may be terminated onto the PCB 422 so that the module may communicate over a CAN bus and PLC as described herein.

Figure 4C:
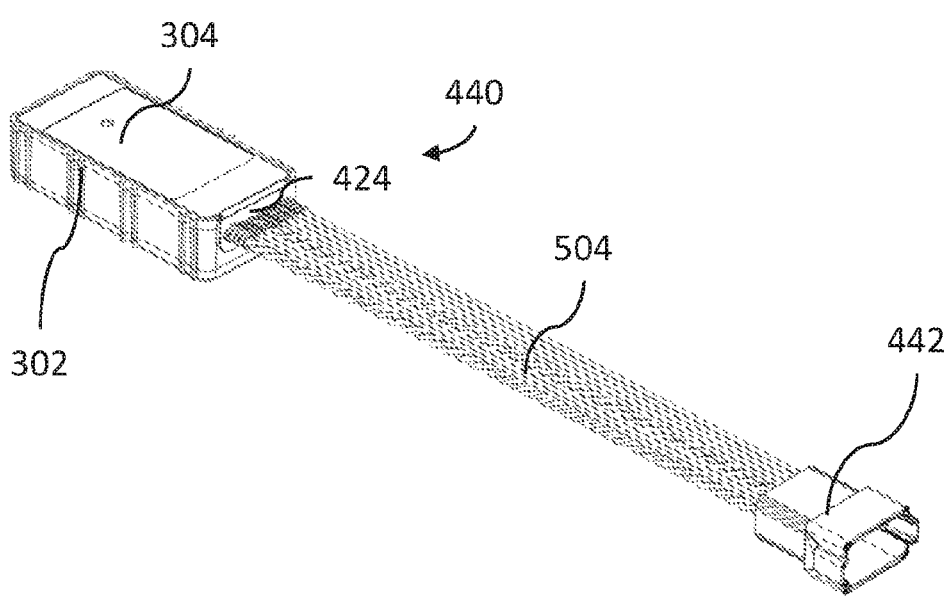
FIG. 4C is a perspective view of the example housing of FIG. 3 with a connector for electrical conductors inserted into an opening of the housing and a connector configured to connect the electrical conductors to a battery, in embodiments.

FIG. 4C is a perspective view 440 of the example housing 302 of FIG. 3 with the seal 424 for electrical conductors inserted into an opening of the housing 302 and the connector 442 configured to connect the electrical conductors to a battery, in embodiments. In other words, FIG. 4C shows an assembly that includes a module as described herein, electrical conductors for connecting to a battery, and the connector 442 for removably connecting the module to a battery as described herein.

FIG. 8 is a flow chart illustrating an example method 800 for communicating between a battery and battery charger, in embodiments. At an operation 802, first data is received from a battery management system (BMS) of the battery via a controller area network (CAN) bus of the battery. Such data may include information about the battery or cells within the battery, such as voltage, charge state, temperature, etc. Such data could also include a signal indicating whether a charger is connected to the battery, readiness of the battery to be charged, and/or a battery identifier (e.g., serial number or other unique identifier).

At an operation 804, second data indicative of the first data is transmitted to a controller of the battery charger via a power line configured to connect the battery and the battery charger. Here, information is sent to the charger that is or is related to the information received from the BMS. Such information may be status information of the battery, instructions for charging the battery, etc. as described herein. Accordingly, a signal received from a BMS may be decoded so that information from that signal may be encoded as a PLC signal as described herein for transmission to the charger.

At an operation 806, first data is received from a controller of the battery charger via the power line that connects the battery and the battery charger. At an operation 808, second data indicative of the first data is transmitted to the (BMS) of the battery via the CAN bus of the battery. Accordingly, a signal received from a controller of a charger may be decoded so that information from that signal may be encoded as a CAN bus signal as described herein for transmission to the BMS of the battery.

Figure 9:
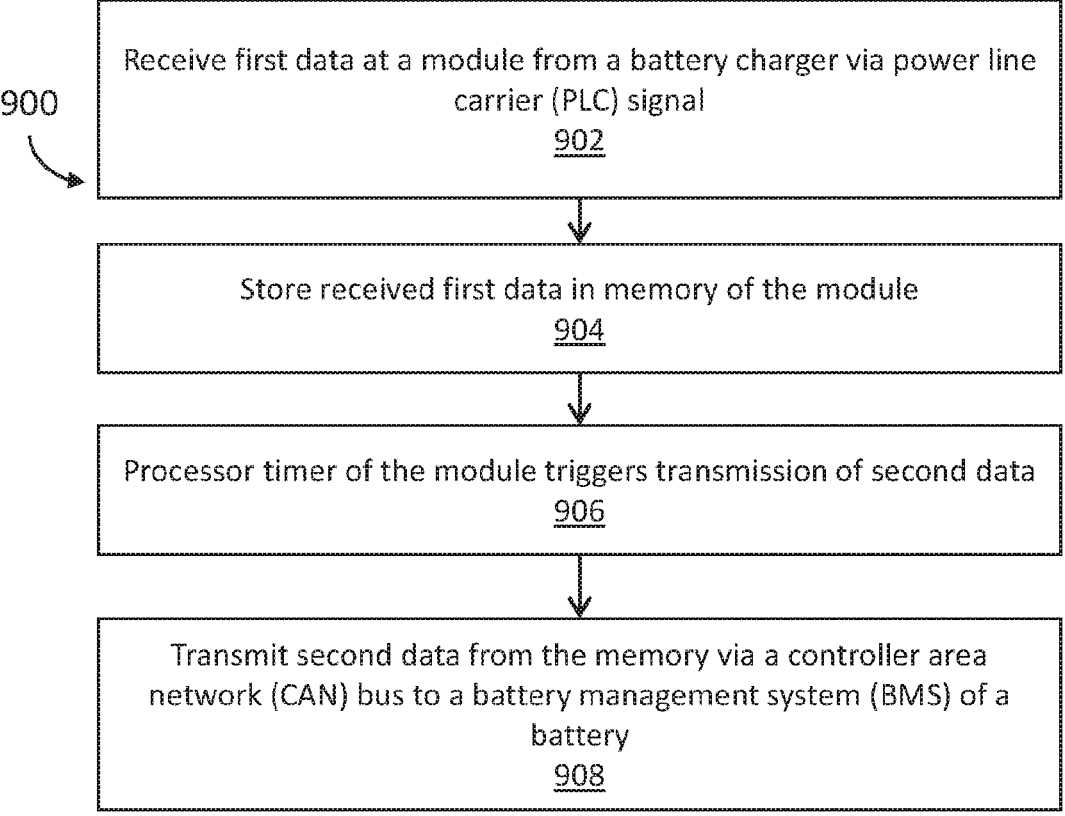
FIG. 9 is a flow chart illustrating an example method for receiving data from a battery charger and transmitting data to a battery management system (BMS) of a battery, in embodiments.

FIG. 9 is a flow chart illustrating an example method 900 for receiving data from a battery charger and transmitting data to a battery management system (BMS) of a battery, in embodiments. At an operation 902, first data is received at a module (e.g., the module 190 of FIG. 1) from a battery charger (e.g., the charger 166 of FIG. 1) via a power line carrier (PLC) signal. That first data may then be stored in a memory of the module (e.g., the memory 204 of the module 190) by a processor (e.g., the processor 202 of FIG. 2) at an operation 904.

At an operation 906, a processor timer of the module may trigger transmission of second data. In other words, the module may be configured on a timing schedule such that there is a window in which the module may transmit data without other data being transmitted over the CAN bus (e.g., from a BMS of the battery). The second data may be the same or similar to the first data (e.g., may be representative of the first data but formatted for CAN bus transmission rather than PLC transmission). At an operation 908, the second data is transmitted from the memory via a CAN bus to a BMS of a battery.

Figure 10:
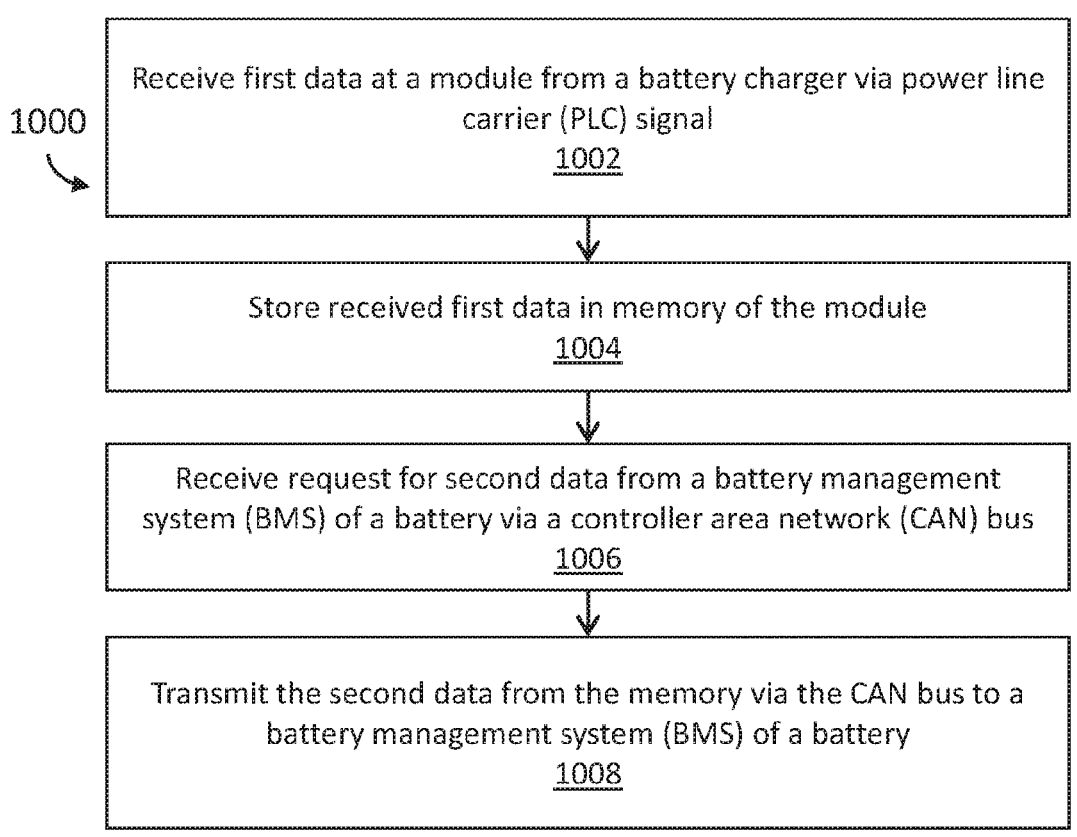
FIG. 10 is a flow chart illustrating an example method for receiving a request for data from a battery management system (BMS) of a battery, in embodiments.

FIG. 10 is a flow chart illustrating an example method 1000 for receiving a request for data from a battery management system (BMS) of a battery, in embodiments. Operation 1002 and 1004, may be the same as or similar to the operations 902 and 904 of FIG. 9. At an operation 1006, the module may receive a request for second data from a BMS of a battery via a CAN bus. In response, at an operation 1008, the second data may be transmitted from the memory of the module via the CAN bus to the BMS of the battery. In this way, the BMS may request specific data from the module, including data similar to or the same as data received from a battery charger via PLC.

Figure 11:
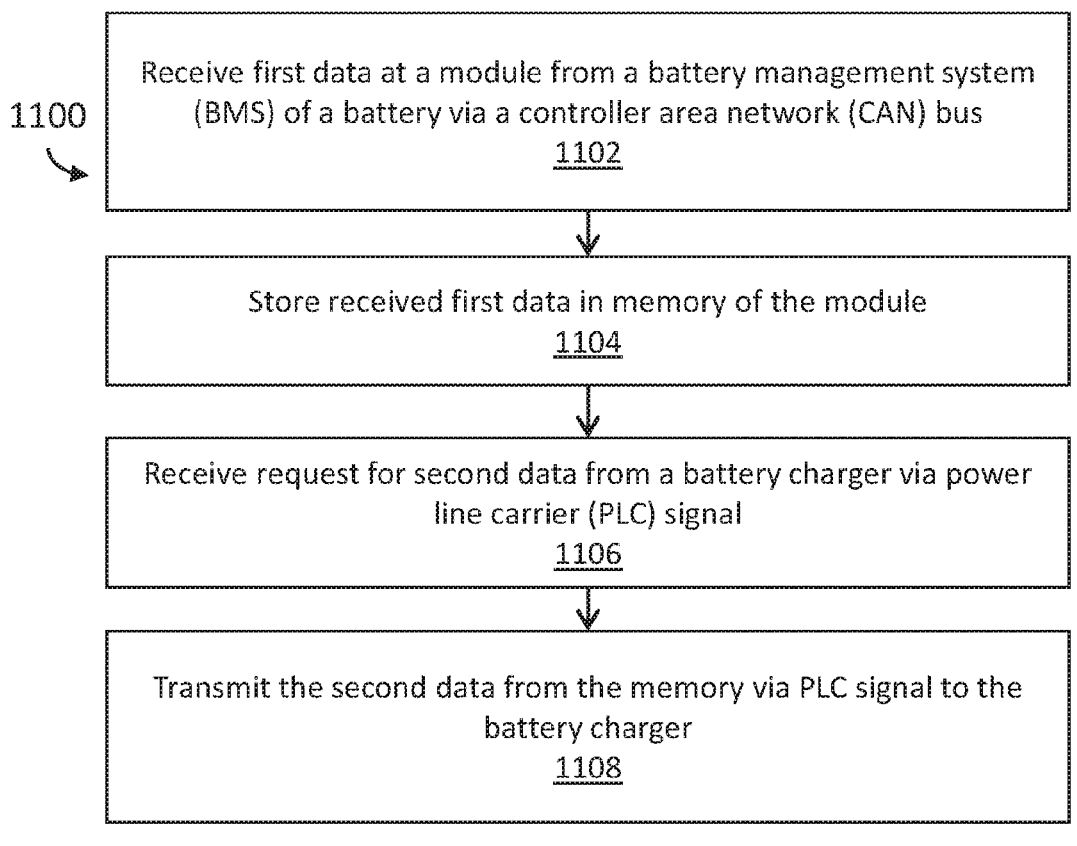
FIG. 11 is a flow chart illustrating an example method for receiving data from battery management system (BMS) of a battery and transmitting data to a battery charger, in embodiments.

FIG. 11 is a flow chart illustrating an example method 1100 for receiving data from battery management system (BMS) of a battery and transmitting data to a battery charger, in embodiments. At an operation 1102, first data is received at a module from a BMS of a battery via a CAN bus of the battery. At an operation 1104, that data may be stored in a memory of the module. At an operation 1106, a request for second data may be received from a battery charger via a PLC signal. The second data may be the same as, similar to, or representative of the first data in various embodiments (e.g., the second data may be representative of the first data but formatted for PLC transmission rather than CAN bus transmission). At an operation 1108, the second data may be transmitted from the memory via a PLC signal to the battery charger responsive to the request at the operation 1106.

Figure 12:
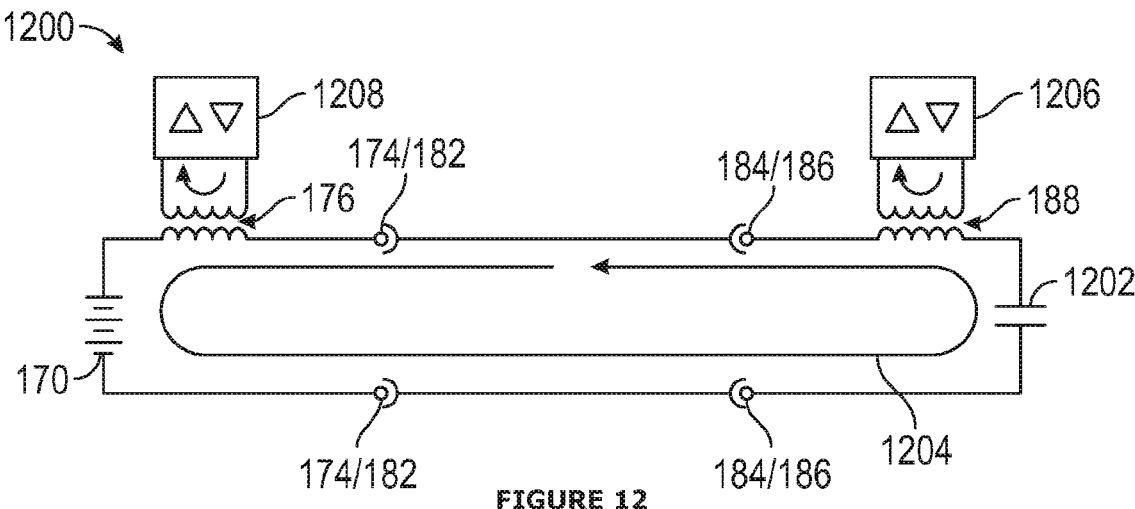
FIG. 12 is a diagrammatic view of an example power line carrier (PLC) signal flow between a battery and a battery charger, in embodiments.

FIG. 12 is a diagrammatic view of an example power line carrier (PLC) signal flow 1200 between a battery and a battery charger, in embodiments. In particular, FIG. 12 shows a possible flow of PLC signals in accordance with the example systems and methods described herein. For example, the connectors 174/182 of FIG. 1 include terminals shown in FIG. 12 for charging a battery, and the connectors 184/186 of FIG. 1 further include terminals shown in FIG. 12 for charging a battery. FIG. 1 further includes the transformers 176 and 188 as well as the battery cell(s) 170 that are further depicted in FIG. 12.

FIG. 12 further shows a transceiver 1208 of the module 190 for facilitating PLC communication over the loop 1200. The transceiver 1208 may be similar to or may be, for example, the PLC interface 212. Similarly, the controller 168 may include a transceiver 1206 that may include or may be a PLC interface. The capacitance 1202 of FIG. 12 may represent a capacitance across an output of a battery charger such as the charger 166 of FIG. 1.

Accordingly, FIG. 12 demonstrates how communications between the transceivers 1206 and 1208 may flow across the power lines in a direction 1204. In this way, the transceivers 1206 and 1208 may receive and transmit data to one another using the power line configured to charge the battery cell(s) 170 by superimposing signals using the transformers 176 and/or 188, as well as using the transformers 176 and/or 188 to detect superimposed communication signals on the loop 1200.

Figure 13:
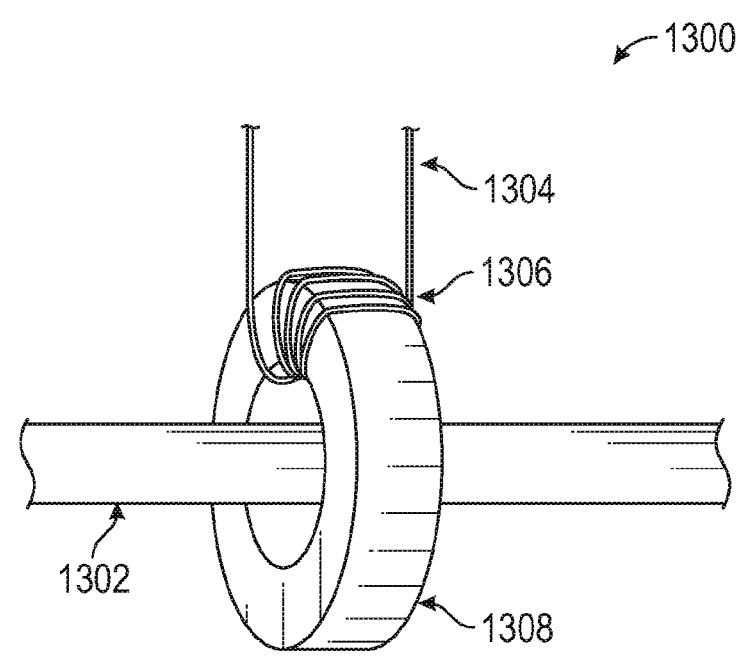
FIG. 13 is a diagrammatic view of an example winding of a transformer for facilitating power line carrier (PLC) communications, in embodiments.

FIG. 13 is a diagrammatic view 1300 of an example winding of a transformer 1300 for facilitating power line carrier (PLC) communications, in embodiments. The components of FIG. 13 may be the same as or similar to components of the transformers 176 and/or 188 of FIG. 1, in various embodiments. In particular, FIG. 13 shows winding lead outs 1304 that connect to electrical conductor 192 and/or controller 168 of FIG. 1, for example.

A toroidal core 1308 may be placed around a power line 1302 (e.g., a conductor of the power line 180 of FIG. 1), and wiring 1306 may be looped around the toroidal core 1308. In this way, the toroidal core 1308 and the wiring 1306 may be a single winding that forms one half of a transformer. The other half of the transformer may be the loop formed by the positive battery cable, the AC path through the battery, the negative battery cable and the AC path through the charger's output capacitance (e.g., the loop 1200 shown in FIG. 12). The transceiver of 168 or 190 (e.g., the transceivers 1206 and/or 1208) may therefore use the transformers 176 and/or 188 to induce an alternating current (AC) in the main loop (e.g., the loop 1200), which will then induce a current in the other PLC winding, which is received by the other receiver.

The power line 1302 (either the positive or negative battery cable, makes no difference as both are part of the same loop) may be a heavy gauge wire that passes through the toroidal core 1308 which has the wiring 1306 as a winding. Together these elements form a transformer, where the PLC winding can induce AC currents in the power line and receive AC current induced on the same power line loop by other PLC windings. This may be advantageous where there is only one power line loop connecting a battery to a charger. As shown in FIG. 13, the transformers 176 and/or 188 may have no electrical connection to the power line loop, and therefore may remain galvanically isolated from the power line loop.

Figure 14:
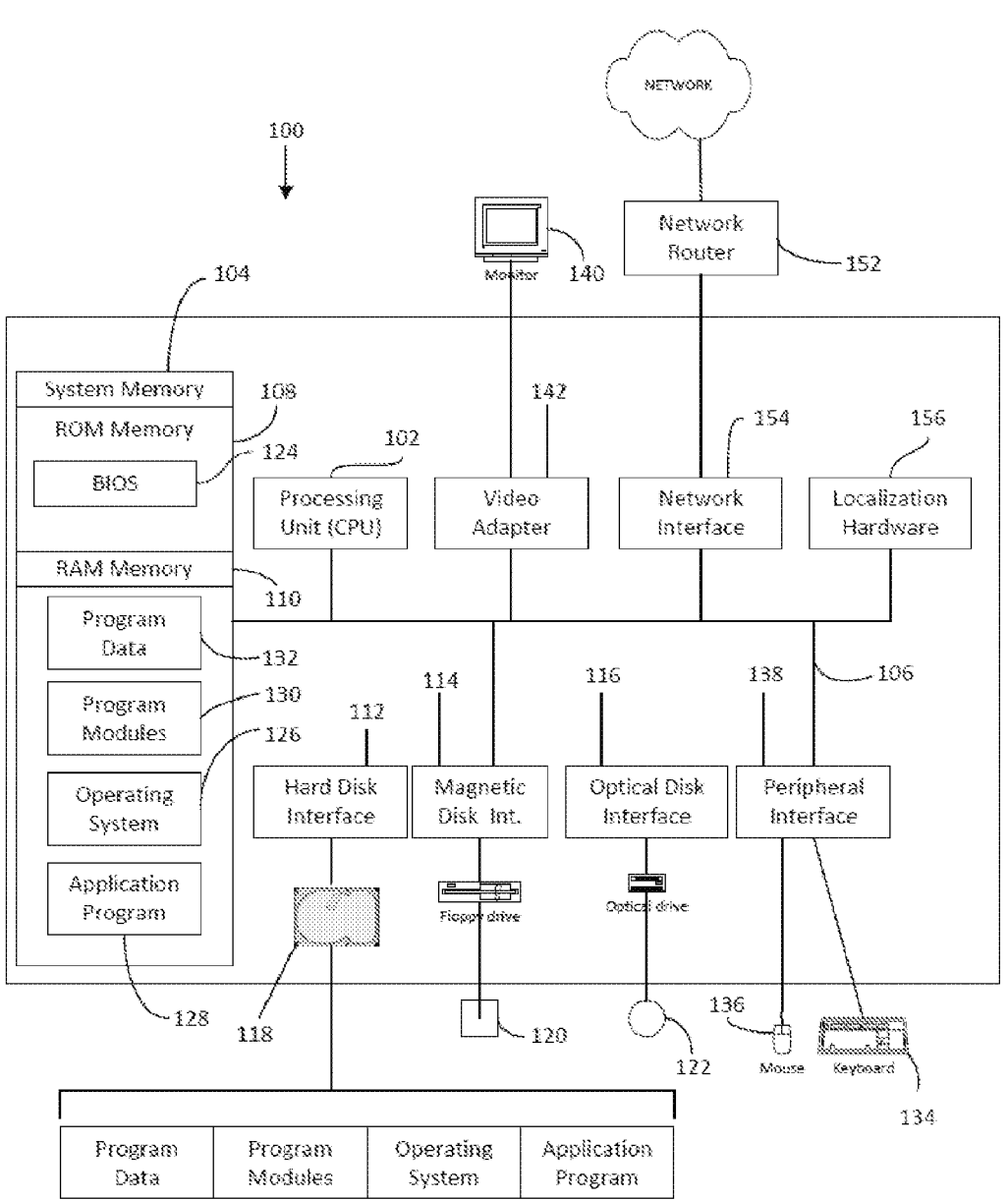
FIG. 14 is a diagrammatic view of an example of a computing environment, in embodiments.

FIG. 14 is a diagrammatic view of an example of a computing environment that includes a general-purpose computing system environment 100, such as a desktop computer, laptop, smartphone, tablet, or any other such device having the ability to execute instructions, such as those stored within a non-transient, computer-readable medium. Various computing devices as disclosed herein (e.g., the battery management system 164, the controller 168, the module 190, or any other computing device) may be similar to the computing system 100 or may include some components of the computing system 100. Furthermore, while described and illustrated in the context of a single computing system 100, those skilled in the art will also appreciate that the various tasks described hereinafter may be practiced in a distributed environment having multiple computing systems 100 linked via a local or wide-area network in which the executable instructions may be associated with and/or executed by one or more of multiple computing systems 100.

In its most basic configuration, computing system environment 100 typically includes at least one processing unit 102 and at least one memory 104, which may be linked via a bus 106. Depending on the exact configuration and type of computing system environment, memory 104 may be volatile (such as RAM 110), non-volatile (such as ROM 108, flash memory, etc.) or some combination of the two. Computing system environment 100 may have additional features and/or functionality. For example, computing system environment 100 may also include additional storage (removable and/or non-removable) including, but not limited to, magnetic or optical disks, tape drives and/or flash drives. Such additional memory devices may be made accessible to the computing system environment 100 by means of, for example, a hard disk drive interface 112, a magnetic disk drive interface 114, and/or an optical disk drive interface 116. As will be understood, these devices, which would be linked to the system bus 306, respectively, allow for reading from and writing to a hard disk 118, reading from or writing to a removable magnetic disk 120, and/or for reading from or writing to a removable optical disk 122, such as a CD/DVD ROM or other optical media. The drive interfaces and their associated computer-readable media allow for the nonvolatile storage of computer readable instructions, data structures, program modules and other data for the computing system environment 100. Those skilled in the art will further appreciate that other types of computer readable media that can store data may be used for this same purpose. Examples of such media devices include, but are not limited to, magnetic cassettes, flash memory cards, digital video-disks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 100.

A number of program modules may be stored in one or more of the memory/media devices. For example, a basic input/output system (BIOS) 124, containing the basic routines that help to transfer information between elements within the computing system environment 100, such as during start-up, may be stored in ROM 108. Similarly, RAM 110, hard drive 118, and/or peripheral memory devices may be used to store computer executable instructions comprising an operating system 126, one or more applications programs 128 (which may include the functionality disclosed herein, for example), other program modules 130, and/or program data 122. Still further, computer-executable instructions may be downloaded to the computing environment 100 as needed, for example, via a network connection.

An end-user may enter commands and information into the computing system environment 100 through input devices such as a keyboard 134 and/or a pointing device 136. While not illustrated, other input devices may include a microphone, a joystick, a game pad, a scanner, etc. These and other input devices would typically be connected to the processing unit 102 by means of a peripheral interface 138 which, in turn, would be coupled to bus 106. Input devices may be directly or indirectly connected to processor 102 via interfaces such as, for example, a parallel port, game port, firewire, or a universal serial bus (USB). To view information from the computing system environment 100, a monitor 140 or other type of display device may also be connected to bus 106 via an interface, such as via video adapter 132. In addition to the monitor 140, the computing system environment 100 may also include other peripheral output devices, not shown, such as speakers and printers.

The computing system environment 100 may also utilize logical connections to one or more computing system environments. Communications between the computing system environment 100 and the remote computing system environment may be exchanged via a further processing device, such a network router 152, that is responsible for network routing. Communications with the network router 152 may be performed via a network interface component 154. Thus, within such a networked environment, e.g., the Internet, World Wide Web, LAN, or other like type of wired or wireless network, it will be appreciated that program modules depicted relative to the computing system environment 100, or portions thereof, may be stored in the memory storage device(s) of the computing system environment 100.

The computing system environment 100 may also include localization hardware 186 for determining a location of the computing system environment 100. In some instances, the localization hardware 156 may include, for example only, a GPS antenna, an RFID chip or reader, a WiFi antenna, or other computing hardware that may be used to capture or transmit signals that may be used to determine the location of the computing system environment 100.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A method of communicating between a battery and a battery charger comprising:

receiving, at a processor, first data from a battery management system (BMS) of the battery via a controller area network (CAN) bus of the battery, wherein the CAN bus comprises a first electrical conductor of the BMS; and transmitting, by the processor via a second conductor of the BMS configured to connect the processor to a first winding of a transformer of the battery, second data indicative of the first data to a controller of the battery charger via a power line configured to connect the battery and the battery charger.

2. The method of claim 1, wherein the second data is further transmitted to the power line via a transformer connecting the processor and the power line.

3. The method of claim 1, wherein the first data comprises information about at least one of a state of charge of the battery, a temperature of the battery, or a voltage of the battery.

4. The method of claim 1, wherein the first data is encoded in a first signal configured for CAN bus communications and the second data is encoded in a second signal configured as a power line carrier (PLC) signal.

5. The method of claim 4, further comprising:

decoding, by the processor, the first data from the first signal; and generating, by the processor, the second signal based on the first data, wherein the transmitting of the second data comprises transmitting the second signal to the controller of the battery charger.

6. The method of claim 1, further comprising storing, by the processor, the first data on a memory coupled to the processor.

7. The method of claim 1, wherein the transformer is within a housing of the battery.

8. The method of claim 1, wherein the power line is configured to removably connect the battery and the battery charger.

9. The method of claim 1, wherein transmitting of the second data is configured to alternate with receiving, by the processor, third data from the controller of the battery such that the second data is not transmitted at the same time the third data is received.

10. A method of communicating between a battery and a battery charger comprising:

receiving, at a processor via a second conductor of a battery management system (BMS) of the battery configured to connect the processor to a first winding of a transformer of the battery, first data from a controller of the battery charger via a power line configured to connect the battery and the battery charger; and transmitting, by the processor, second data indicative of the first data to the BMS of the battery via a controller area network (CAN) bus of the battery, wherein the CAN bus comprises a first electrical conductor of the BMS.

11. The method of claim 10, wherein the first data is further received from the power line via a transformer connecting the processor and the power line.

12. The method of claim 10, wherein the first data comprises instructions for controlling charging of the battery.

13. The method of claim 10, wherein the first data is encoded in a first signal configured for as a power line carrier (PLC) signal and the second data is encoded in a second signal configured for CAN bus communications.

14. The method of claim 10, wherein the processor is electrically connected to the CAN bus of the battery and to a transformer in communication with the power line, wherein the transformer is within a housing of the battery.

15. The method of claim 10, wherein the power line is configured to removably connect the battery and the battery charger.

16. The method of claim 10, wherein receiving of the first data is configured to alternate with transmitting, by the processor, third data to the controller of the battery such that the second data is not received at the same time the third data is transmitted.

17. An apparatus configured to communicate with a battery management system (BMS) of a battery comprising:

a memory;

a processor coupled to the memory;

at least a first electrical conductor configured to connect the processor to a controller area network (CAN) bus of the battery, wherein the CAN bus is connected to the battery management system (BMS) of the battery; and at least a second electrical conductor configured to connect the processor to a first winding of a transformer of the battery, wherein a second winding of the transformer is connected to a power line of the battery, wherein the power line is configured to connect the battery to the battery charger, wherein the processor is configured to:

receive first data from the BMS via the CAN bus;

transmit second data based on the first data to the battery charger via the power line;

receive third data from the battery charger via the power line; and transmit fourth data based on the third data to the BMS via the CAN bus.

18. The apparatus of claim 17, wherein the processor is configured to alternate transmission of the second data and listening for the third data such that second data and the third data are not travelling over the power line at the same time.

19. The apparatus of claim 17, wherein the apparatus is configured to be removably attachable to the battery or the apparatus is permanently affixed to the battery.

20. The apparatus of claim 17, further comprising a housing in which the memory and the processor are located, wherein the first electrical conductor and the second electrical conductor run from the housing to a housing of the battery.

* * * * *